No. 662,947. Patented Dec. 4, 1900.
M. C. KRARUP.
TOPOGRAPHIC MAP, CHART, &c.
(Application filed Nov. 1, 1899.)
(No Model.)

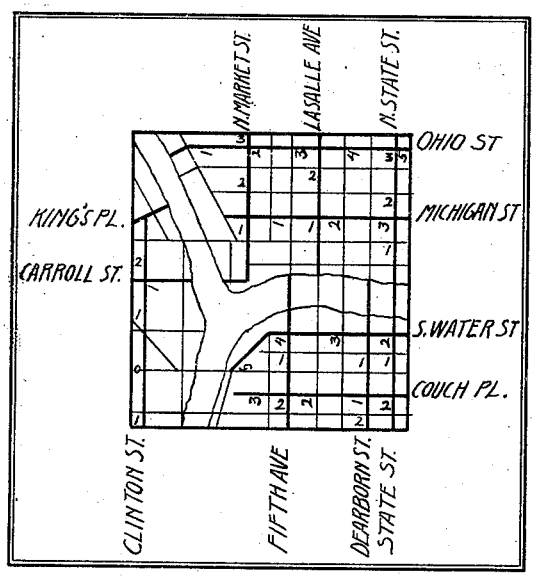

MAP No. 1.

INDEX

| STREET | MAP | STREET | MAP |
| --- | --- | --- | --- |
| CANAL ST. | 2 | KINZIE ST. | 2 |
| CARROLL ST. | 1 | LAKE ST. | 2 |
| CLARK ST. | 3 | LASALLE AVE. | 1 |
| CLINTON ST. | 1 | LASALLE ST. | 2 |
| COUCH PL. | 1 | MARKET ST. | 3 |
| DEARBORN ST. | 1 | N. MARKET ST. | 1 |
| DEARBORN AVE. | 2 | MICHIGAN ST. | 1 |
| FIFTH AVE. | 1 | MILWAUKEE AV. | 2 |
| FRANKLIN ST. | 2 | OHIO ST. | 1 |
| FULTON ST. | 3 | RANDOLPH ST. | 3 |
| HADDOCK PL. | 3 | STATE ST. | 1 |
| ILLINOIS ST. | 3 | S. WATER ST. | 1 |
| INDIANA ST. | 2 | W. WATER ST. | 2 |
| KINGSBURY ST. | 3 | N. WATER ST. | 3 |
| KING'S PL. | 1 | CHICAGO R. | 2 |

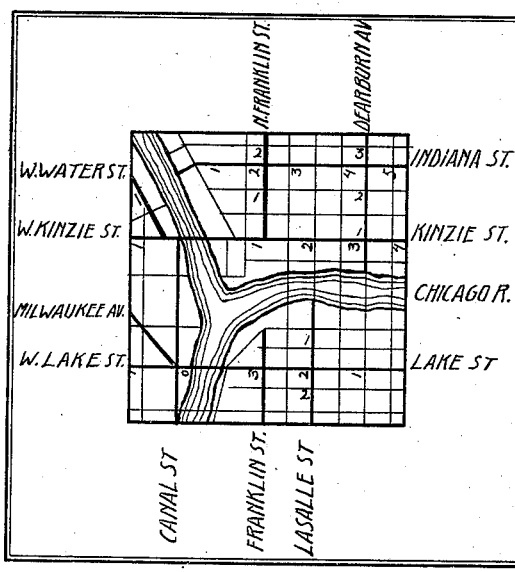

MAP No. 2.

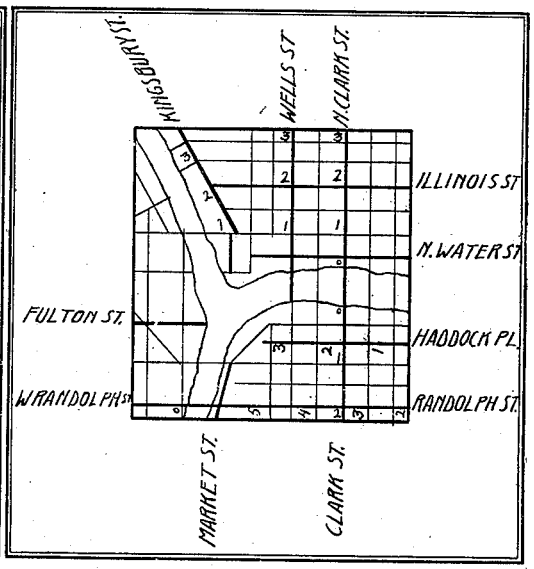

MAP No. 3.

Witnesses:
Harold H. Barrett
C. L. Wood

Inventor:
Marius C. Krarup
by Raymond & Quehundro
Attys

UNITED STATES PATENT OFFICE.

MARIUS C. KRARUP, OF CHICAGO, ILLINOIS.

TOPOGRAPHIC MAP, CHART, &c.

SPECIFICATION forming part of Letters Patent No. 662,947, dated December 4, 1900.

Application filed November 1, 1899. Serial No. 735,484. (No model.)

*To all whom it may concern:*

Be it known that I, MARIUS C. KRARUP, a citizen of the United States, residing at Chicago, in the county of Cook and State of Illinois, have invented certain new and useful Improvements in Topographic Maps, Charts, &c., of which the following is a specification.

This invention relates to improvements in that class of maps, charts, &c., especially intended to give prominence to certain topographic features of a selected area—that is, features having greater relative importance than other features included in the same area—to which ready reference is desired to be made.

The primary object of this invention is to provide graphic delineations representing the topography of selected areas in such manner that the topographical features which come within the scope chosen for said delineation may be readily distinguished and may be located at a glance in their relations to other points within the delineated area in its entirety.

Another object is to delineate topographically a selected area in a plurality of maps, all showing the same topographical features, but each map giving prominence or conspicuousness to a set of features inconspicuously delineated in the other maps.

A further object is to enable the graphic delineation of the topographic features of a selected area, so as to give conspicuousness to selected sets of features, which may thus be readily distinguished upon a smaller scale than has been practicable in charts which are made by methods heretofore in use for delineating areas of similar extent and character.

In a more restricted sense my invention has for one of its objects the provision of a series of topographical charts or maps of States, counties, cities, towns, or other areas whereby the entire course of every street, road, or boundary or any other desired topographical feature is plainly traceable, marked, and designated in its relation to other features and not liable to be confused with other like features.

My invention is applicable, as before stated, to the delineation of any selected area having features which it is desired to graphically illustrate; and it consists generally of a series or plurality of charts or maps all delineating the same area, but each chart or map indicating certain features conspicuously with relation to other features in said area found conspicuously delineated upon the other maps or charts.

In the drawings I have illustrated one of the simplest applications of my invention, showing the graphic delineation of a selected section of a city, together with an index for ready reference, the whole sheet being one of the forms in which a delineation of any particular section may be published; but I may here state that the index or key forms no part of my present invention and is simply illustrated for a more perfect disclosure of the practical use of my invention.

In the drawings, map No. 1 represents one of a series of topographic maps or charts of an arbitrarily-selected portion of a city or town. Map No. 2 represents another map or chart of the same kind, showing the same area, but giving prominence to different features; and map No. 3 represents a third chart or map of the same kind, showing the same area represented by Figures 1 and 2, but giving prominence to still another set of features.

It may here be stated that the number of maps or charts in the series is immaterial and would necessarily vary with the area to be delineated, the number of streets, roads, or other features contained in the area and the distinctness with which it is desired that the features shall appear.

Referring to the drawings, it will be understood that all the lines which indicate streets or other topographic features in map 1 are also shown in maps 2 and 3, and vice versa, so that each of the drawings is a complete delineation of the selected area; but in map 1 certain lines or marks indicating features to which it is desired to give prominence are made conspicuous and the names which are used to indicate the streets or other features of which said lines or marks are symbolic may be imprinted or marked in any manner on map No. 1, while the lines or marks denoting other features in the selected area are indicated on map No. 1 in a less conspicuous manner and the names corresponding to said other lines or marks are omitted.

In map No. 2 some of the lines or marks which are inconspicuous and unnamed in map No. 1 are shown conspicuously and are named, while those which are conspicuous and named in maps Nos. 1 and 3 are inconspicuous and unnamed.

In map No. 3 all of the lines or marks which are not conspicuous and which are not named in either map No. 1 or map No. 2 are made conspicuous and are named. By this plan all of the lines or marks indicating the features which it is deemed desirable to include in the delineation of the area are made conspicuous and may be plainly named in one of the plurality of maps or charts, so that they may be readily traced without confusion with the other features of the same area and yet their relation to all the other features of the same area is plainly indicated.

For convenience in the use of these maps an index, such as that shown in the drawings, may be provided in connection therewith, in which the names corresponding to all the lines or marks are listed and the particular chart or map indicated upon which the line or mark corresponding to any given name is made conspicuous. Furthermore, the lines or marks which are made conspicuous in any one of the maps or charts are so selected as to leave sufficient space between them to permit the delineation of other features by inconspicuous lines or marks and at the same time to insure that each of the conspicuous lines or marks will be readily distinguished from any other lines or marks on the same map or chart and so that the names or inscriptions of all the topographic features of the same selected area indicated on one or another of the maps by said conspicuous lines or marks may be inscribed, printed, or otherwise affixed in larger and more legible characters than would be possible on ordinary maps or charts drawn on the same scale and delineating a similar multiplicity of topographic features.

It is within the contemplation of my invention to have certain lines or marks indicating the same topographic features made conspicuous, and, if desired, named in more than one or in all of the maps or charts, it being frequently desirable to indicate conspicuously topographic features which are well known or familiar to those for whose convenience a particular series of maps or charts is intended, for by so doing these familiar topographic features may serve as guides for the eye and facilitate search for the lines or marks symbolizing other and less well-known features.

While I have explained my invention and its uses in connection with three maps or charts combinedly illustrating the topographic features of a certain selected area, it will be understood that I do not limit myself to this number, but that, on the contrary, my invention is applicable to all cases in which a plurality of maps or charts, each representing the same area in its entirety, are produced in the manner described.

In the drawings I have shown the conspicuous features on each map as being represented by comparatively broad lines, so as to present a black or heavy conspicuous appearance, while other lines or marks are comparatively thin and narrow, presenting a light appearance. In practice other methods for making certain lines or marks comparatively conspicuous may be employed, such as by contrasting colored lines or marks or shading of any kind, and such other methods are included in the scope of my invention. For example, the inconspicuous lines may be drawn or printed in pale blue or in any other light color, while the conspicuous lines or marks are drawn or printed in dark blue, red, black, or any other color. Indeed it is immaterial what method is adopted for making certain lines or marks more conspicuous than others, so long as upon each map or chart of a series all of the topographic features of a selected area are indicated and certain of them are conspicuously indicated upon each one of the maps.

In maps as heretofore published it has been customary to attain the desired degree of plainness, legibility, and readiness of reference either by making the size of the map relatively large or by dividing the selected area into sections and representing each of these sections on a separate sheet; but by neither of these methods are the desirable characteristics of a reference-map fully attained, it being understood, of course, that the difficulties arise chiefly when the topographical features to be delineated and names are numerous and relatively close together. When the entire selected area is delineated on a large sheet and all the names and words which are necessary for reference to the topographical features of said area are marked on said sheet, a number of objectionable characteristics are produced, of which the following may be mentioned: First, the sheet must necessarily be so large as to become unwieldy and difficult to handle unless it is hung against a wall or otherwise spread over a large plane surface, which is not always available, and, secondly, the size of the map makes it impossible to obtain a visual impression of it in its entirety when the user of the map is sufficiently close to it to follow its delineations and read the inscriptions on it. It follows from this that topographical features—such as streets in a city or roads or railroads, &c.—which may extend across the entire area, cannot be seen in their entirety at one glance and cannot be readily conceived of in their relations to all other features within the delineated area. This objectionable feature is well understood, and maps are therefore ordinarily made no larger than absolutely necessary for permitting each feature and each inscription to be distinguished with the naked eye at ordinary reading distance; but when space is thus economized a new objectionable character develops—namely, the features of the map are brought so close together that confusion arises from the difficulty in following each of them distinctly with the eye; also, and this is still more important, it becomes difficult to determine whether the inscriptions on the map refer to one topographical feature or to another feature delineated in close proximity to it. In order to avoid confusion from this cause, it has been customary to place names and words between lines outlining each feature to which they specially refer. By so doing the space separating the delineations of the various features is rendered useless for inscription purposes—that is, it cannot be utilized for permitting increased size of inscriptions, but merely serves the purpose of separating to the eye the various delineations. It is readily seen that the objectionable characteristic here referred to tends toward either diminishing the size and legibility of inscriptions or increasing the size of the map.

By my invention the features marked inconspicuously serve to separate those marked conspicuously on each map belonging to a set, and by this provision it is made possible to utilize the entire space separating said conspicuous features whenever it may be found desirable to do so for inscriptions in relatively large and legible characters, and a great economy in the total size of the map is thereby effected without sacrifice of the desirable characteristics of a reference-map.

In the attempts that have been made to produce suitable reference-maps delineating such areas as are here principally referred to by dividing the selected area into sections and delineating each section on a separate sheet other difficulties have been encountered. Their advantages are only those which may be obtained by delineating the area on a large scale in conjunction with those which arise from having each section in a less unwieldy form than if it formed an integral portion of a large sheet. The objections, on the other hand, are obvious in all cases when the entire selected area is of such general character that the user of the map may frequently desire to ascertain the relations between one or more topographical features and other topographical features or the selected area in its entirety. It is also a serious objection that any one topographic feature which extends over more than one of the sections of the area—such as streets in a city, roads, railways, &c.—cannot be traced in continuity or without consulting more than one of the sheets comprising such sectional maps. It is also an objection that inscriptions designating features extending over more than one of the said sections must be repeated on each of said sections.

In both classes of ordinary maps here referred to it is an objection that no means are provided for distinguishing at a glance one topographical feature from another similar one if the latter appears in continuation of or in juxtaposition to such other feature. Such features may be designated by different names, and it may frequently be of importance to determine quickly and readily where one name ceases to apply and where the other name begins to apply. In ordinary maps this may only be done in a measure by repeated inscription of names, frequently where there is scant room for making such names legible, while by my invention it is practically always possible to so select the features which are to be marked conspicuously on any one of the maps comprising a set that any other feature whose delineation would ordinarily conflict with the proper appreciation of the delineation of the first feature referred to may be marked inconspicuously on the same map and conspicuously on one of the other maps, so as to bring each of the ordinarily conflicting features into sharp contrast, and thus render the map in its totality more useful for one of its purposes than any map produced by previous methods.

It will thus be seen that the advantages of my system of delineating the topographic features of a selected area are very great from both a commercial and illustrative point of view, that by no other prior method can the features of the selected area be each given the same degree of conspicuousness with relation to all the other features of such area as by my system, that no matter how large a map or series of maps may be made by the present methods the features of the selected area cannot all be given conspicuousness with relation to all the other features of such area, and that as a result of the economy of space pocket-maps illustrating large areas are made possible that have heretofore been impossible.

In practice it is immaterial whether the several maps of the series or system are imprinted upon a single sheet of convenient size to be hung up on a wall or folded to be carried in the pocket or whether each map is made to constitute a page of a book, which may be made small enough to carry in the pocket or large enough for use as an ordinary reference-book, as all such applications of my invention are obvious and within the contemplation thereof.

Having thus fully described my invention, what I claim, and desire to secure by Letters Patent, is—

1. A topographic chart comprising a plurality of maps all delineating by lines or marks the same topographic features of a selected area, but each varying from the other in the relative conspicuousness of the lines or marks delineating certain sets of features, substantially as described.

2. A topographic chart comprising a plurality of maps each describing the same topographic features of a selected area, completely by delineation and incompletely by relatively conspicuous lines or marks, said conspicuous lines or marks on each map representing a different set of topographic features from those conspicuously represented on the other maps, substantially as described.

3. A topographic chart comprising a plurality of maps each containing delineations that symbolize completely, in extent and in number, the topographic features of a selected area, but varying in the relative prominence or conspicuousness accorded various topographic features, substantially as described.

4. A topographic chart comprising a plurality of maps each containing delineations descriptive of the same topographic features of a selected area, the delineation of different sets of features being relatively conspicuous on the different maps and each map containing the names or designations of the set of features made conspicuous thereon, whereby the plurality of charts combinedly contains all of the topographic features of the selected area and the names by which said features are designated, substantially as described.

5. The topographic chart for graphically delineating the topographic features of a selected area consisting in a series of maps all delineating the same topographic features of a selected area, but each showing conspicuously certain features that are shown inconspicuously on the other maps, substantially as and for the purpose described.

MARIUS C. KRARUP.

Witnesses:
C. L. WOOD,
F. H. DRURY.